(12) United States Patent
Hullot et al.

(10) Patent No.: US 8,041,291 B2
(45) Date of Patent: Oct. 18, 2011

(54) DELIVERING CONTENT TO MOBILE ELECTRONIC COMMUNICATIONS DEVICES

(75) Inventors: Jean Marie Hullot, Bougival (FR); Bertrand Guiheneuf, Paris (FR)

(73) Assignee: Apple Inc., Cupertino, CA (US)

( * ) Notice: Subject to any disclaimer, the term of this patent is extended or adjusted under 35 U.S.C. 154(b) by 813 days.

(21) Appl. No.: 11/592,397

(22) Filed: Nov. 3, 2006

(65) Prior Publication Data

US 2008/0108299 A1 May 8, 2008

(51) Int. Cl.
*H04H 20/71* (2008.01)
(52) U.S. Cl. .................. 455/3.01; 345/156; 709/207
(58) Field of Classification Search .............. 455/3.01; 345/156; 709/207
See application file for complete search history.

(56) References Cited

U.S. PATENT DOCUMENTS

| | | | |
|---|---|---|---|
| 6,487,390 B1* | 11/2002 | Virine et al. | 455/3.01 |
| 6,874,094 B2 | 3/2005 | Parker | |
| 7,598,945 B2 | 10/2009 | Lee | |
| 2003/0225847 A1* | 12/2003 | Heikes et al. | 709/207 |
| 2004/0003117 A1* | 1/2004 | McCoy et al. | 709/246 |
| 2004/0056651 A1 | 3/2004 | Bersana | |
| 2004/0140989 A1* | 7/2004 | Papageorge | 345/700 |
| 2004/0266416 A1 | 12/2004 | Matsumoto | |
| 2005/0064852 A1* | 3/2005 | Baldursson | 455/414.2 |
| 2006/0073854 A1 | 4/2006 | Ono et al. | |
| 2006/0248121 A1* | 11/2006 | Cacenco et al. | 707/200 |
| 2007/0018957 A1* | 1/2007 | Seo | 345/156 |

FOREIGN PATENT DOCUMENTS

| | | |
|---|---|---|
| EP | 1452970 A1 | 9/2004 |
| GB | 2373977 A | 10/2002 |
| WO | WO 03/061273 A1 | 7/2003 |

OTHER PUBLICATIONS

Wallpaper Magic, Free software downloads and software reviews, CNET Download.com, Version 2.5, Operating System: Windows 95/98/Me/2000/XP/NT, Mar. 26, 2004, downloaded Apr. 26, 2011 at http://download.cnet.com/Wallpaper-Magic/3000-2336_4-10015641.html, 6 pages.
Wallpaper Magic, NAPA Software, Copyright © 1997-2003, NAPA Software Inc., downloaded Apr. 26, 2011 at http://www.napasoftware.com/wallpaper_magic.html, 3 pages.
SlideShow Desktop Release History, Multiple versions released between Jul. 16, 2001 and Nov. 16, 2010, Copyright © 2000-2010 Desktop Designs™, downloaded Apr. 26, 2011 at http://www.slideshowdesktop.com/history.htm, 13 pages.
Office Action for U.S. Appl. No. 11/592,697, mailed May 26, 2010, 15 pages.
Office Action for U.S. Appl. No. 11/592,697, mailed Nov. 15, 2010, 13 pages.

* cited by examiner

*Primary Examiner* — Charles Appiah
*Assistant Examiner* — Alexander Yi
(74) *Attorney, Agent, or Firm* — Blakely, Sokoloff, Taylor & Zafman LLP

(57) ABSTRACT

Methods, apparatuses, and machine readable media relating to content delivery are described herein. A method, according to one embodiment described herein, includes delivering content to a mobile electronic communications device, such as a cell phone, wherein the content is delivered as a predetermined group of images. A server may store various groups of images of wallpapers for a cell phone, and a cell phone user may download a specific group of wallpapers or background images for the cell phone. Apparatuses, media and other methods are also described.

44 Claims, 14 Drawing Sheets

DELIVERING CONTENT TO MOBILE ELECTRONIC COMMUNICATIONS DEVICES

The present invention relates to a method and apparatus for delivering image content to mobile electronic communications devices, such as mobile phones, portable music players, games consoles and personal digital organisers (PDAs).

BACKGROUND OF THE INVENTION

It is known for electronic devices to display both a main image, which generally represents useful information relating to the device, and a background image. An example is shown in FIG. 1A, which illustrates a mobile telephone 1000 comprising a keypad 1020 and a display 1010. The display 1010 shows a combination of two distinct images. The first, shown in FIG. 1B, is a main image and includes useful information such as the name of the mobile telephone service carrier (XX), the name of the user (Andy), menu selection information (Menu and Names), a reception bar on the right indicating the strength of a signal received by the mobile phone, and a power bar on the left indicating the power remaining in the battery. Thus, it will be clear that the main image need not be a single unitary image, but also can correspond to a plurality of separate icons or other images displayed at the same time.

This main image is superimposed on a background image, shown in FIG. 1C. In this example, the background image simply comprises a number of wavy lines. However, it could comprise any image, such as a picture, a photograph or an animated image. Again, the background image need not be a single unitary image, but also can correspond to a plurality of separate icons or other images displayed at the same time. The background and main images, or parts thereof, may also be video clips and the like In the example shown in FIG. 1, a digital clock could be included at the top right of the main image. Alternatively, the main image could include a representation of an analogue clock. Thus, the main image may also be animated. As an alternative, the clock could be included in the background image instead of the main image. Thus, it is clear that the elements to be included in the main image and the background image are to some extent interchangeable.

In general, the main image will change during use of the phone. For example, if an incoming call is received, the main image will be altered to reflect this to the user. In particular, it is well-known for the main image to change to display the name and/or number of the caller. Similarly, if the user wishes to make a phone call, he may use an address book provided in the phone. As the user scrolls through the address book, the main image will change to guide him or her through the address book. Similarly, the main image will change as the user is guided through different levels of the menu system provided in the phone. The main image will also change as the strength of signal reception changes and as the battery is charged or run down.

However, the background image need not, and generally does not, change as the main image changes. Such a background image is commonly referred to as a wallpaper image since it can comprise a repeated pattern and appear similar to conventional wallpaper used for interior decoration. Generally, the wallpaper or background image is decorative, although it may also have an information-providing function, such as the clock discussed above.

When a call is received, a user is accessing different levels of a menu system and the like, it is common to display only the main image. Thus, the main image and the wallpaper image are displayed simultaneously only at the top level of the menu system, as the phone awaits an action to occur. However, there is no reason that the main image and the wallpaper cannot be displayed simultaneously at any predetermined time.

Although the main image will change as the phone is used, the background image will not change as the main image changes. Such a background image is commonly referred to as a wallpaper image since it can comprise a repeated pattern and appear similar to conventional wallpaper used for interior decoration. Generally, the wallpaper or background image is decorative, although it may also have an information-providing function, such as the clock discussed above. There is no reason that a wallpaper image cannot be the only image to be displayed at a particular time and the term background image is intended to include the case where the background image is the only image to be displayed.

It is known to store several background images in the phone and for the user to be able to set manually which background image is displayed.

Mobile phones and other mobile electronic communications devices with built in cameras are also well known. In such devices, when a user takes a picture a digital image is stored in the memory of the device, for example as a ".gif" or other format file. The image can then be displayed on the mobile phone, as the only image, as the main image or as a background image.

Similarly, it is known to transmit a digital image to a mobile phone or other mobile electronic communications device for display as the only image, the main image or a background image. Such digital images need not be photographs but can instead be computer generated images. In the same way, it is known to transmit other digital content such as a ring tone to a mobile phone or other mobile electronic communications device. In general, such content is transmitted to the device after the user makes a request to a service provider, for example by sending a short message service (SMS) text message or over the Internet. The transmitted content is stored in a memory provided in the device for subsequent or immediate use.

FIG. 2 shows a communications network suitable for transmitting digital content to a mobile phone. Specifically, FIG. 2 shows a mobile phone 80, a base station 85, a terrestrial communications centre 90 and a server 95. The base station 85 includes a transmitter and receiver, by which it can exchange data over the air, for example using microwaves, with the mobile phone 80. To receive a desired ring tone, a user sends an SMS text message from the mobile phone with an identification of the desired ring tone to a predetermined number. The request also carries an identification of the mobile phone from which the SMS message is sent. The SMS message is received over the air by the base station 85, from where it is transmitted to the terrestrial communications centre 90 and eventually the server 95.

Alternatively, a user may send the request to the server over the Internet using a personal computer 82, the request again including an identification of the desired ring tone and an identification of the mobile phone to which the ring tone should be sent.

In either case, the server 95 then transmits the desired ring tone over the air direct to the mobile phone 80 via the terrestrial communications centre 90 and the base station 85. The ring tone is sent in the form of a digital signal, which is demodulated and decoded by the mobile phone and stored as software in a memory of the phone 80. Preferably, the signal is sent in the form of an MMS (multimedia message service) message. However, other formats such as WAP (wireless application protocol) could equally be used. Also included in the memory of the phone will be complementary software, which will operate in tandem with the recently received ring tone data to cause the phone to use the new ring tone when a call is received. If this complementary software is not already stored in the memory, it can be sent to phone over the air.

It is also known for mobile phones to "deactivate" after the phone has not been used for a certain period of time. In one example, the phone comprises a conventional liquid crystal display (LCD) device with a backlight. If the phone has not been used for a predetermined period of time, the phone enters a sleep mode in which the backlight is switched off to save energy. In this specification, the term "deactivate" and like terms include, for example, switching off of the backlight. Of course, the LCD may also be front lit.

A mobile phone or other electronic device may have any one or more of several different kinds of deactivation. In the example discussed above, another instance of deactivation may be to lock the keypad, for example after a further predetermined period has elapsed following switching off of the backlight. If the keypad is locked, then pressing of the keys will not control the phone in the way required by the user until a predetermined key or combination of keys has been pressed to unlock the keypad. Pressing the correct key or combination of keys will not only unlock the keypad, it will also switch the backlight on again.

Other instances of deactivation include entering a sleep mode and switching off the display altogether; and displaying an energy-saving display, such as an unlit, mostly black display, with a clock. The phone may enter the sleep mode, for example, after a further predetermined period has elapsed following locking of the keypad. Another instance of deactivation may be to switch off the phone completely. The phone could also be deactivated after the user finishes making a call or when the user enters an instruction for deactivation.

SUMMARY OF THE INVENTION

According to a first aspect of the present invention, there is provided a method of delivering content to a mobile electronic communications device, for example a cellphone, the method comprising: storing in a content delivery apparatus a plurality of images, each image for display by the mobile electronic communications device; and transmitting together a predetermined group of said images to the mobile electronic communications device. In the present invention, a plurality of groups of images can be stored on a server, a request can be received from a user to transmit a selected group of images for a cellphone, and the selected group can be transmitted for viewing on the cellphone.

According to another aspect, there is also provided a content delivery apparatus for a communications network, the apparatus comprising: a memory having stored therein at least one group of a plurality of images, each image for display by a mobile electronic communications device; and a transmission component for transmitting together the group of images to the mobile electronic communications device. The apparatus may be a server.

For example, the server of a content provider may store various groups of images of wallpapers for a cellphone. The cellphone user may download a specific group of wallpapers for his cellphone. If the user takes a subscription, each time the group is updated, the group of wallpapers on the cellphone is also updated. The user may also publish a group of images to a content provider for download by other users. Each time the user updates the group, for example by adding new images, the other users who subscribe to the published group will be updated.

Other aspects of the invention include a corresponding computer program and computer program product.

BRIEF DESCRIPTION OF THE DRAWINGS

The present invention will be described by way of example only, with reference to the accompanying drawings, in which.

DETAILED DESCRIPTION

Figure 3:
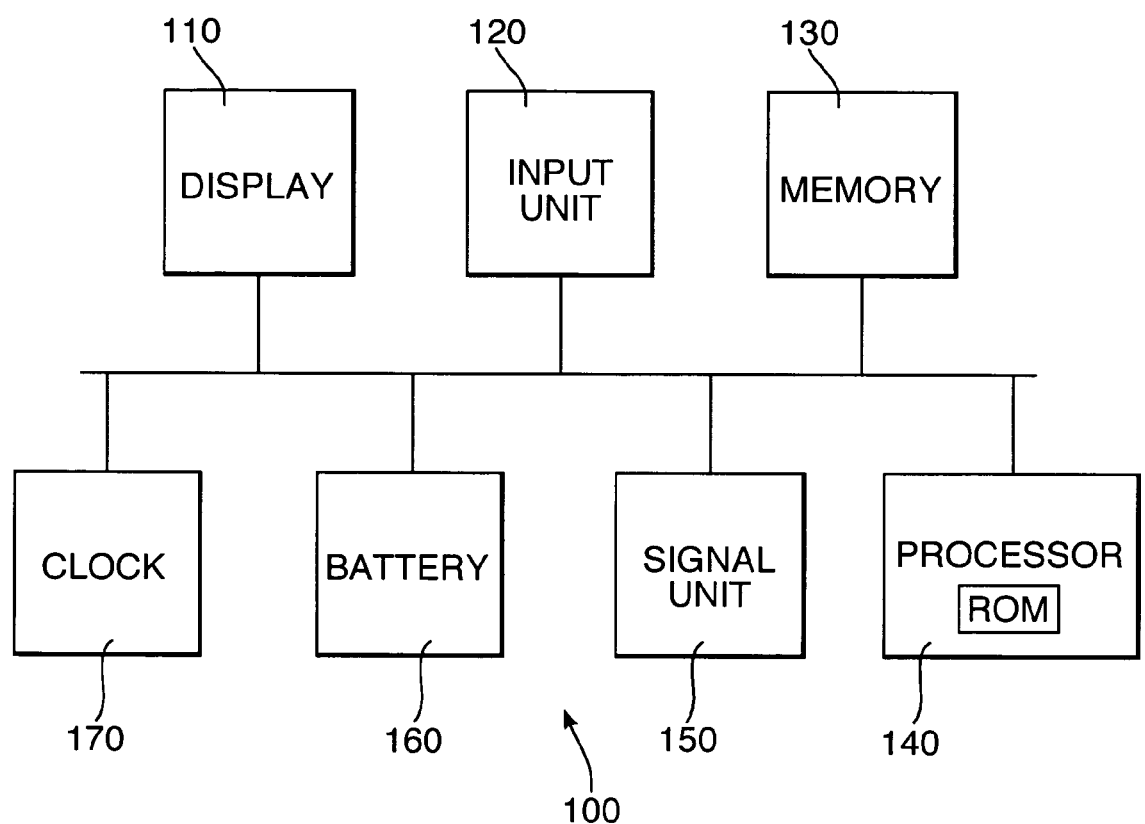
FIG. 3 is a block diagram of the architecture of a personal digital assistant (PDA)

FIG. 3 is a block diagram of the architecture of a personal digital assistant (PDA) 100 suitable for use in the present invention. The PDA 100 includes a display 110, by which both main and background images can be displayed under the control of a processor 140. The processor 140 also has control of other functions of the PDA 100 and includes a read only memory ROM, in which are stored instructions for operating the processor. However, the ROM may be provided separately from the processor. The instructions can be provided in the form of hardware or software.

The PDA 100 further comprises an input unit 120, such as a keyboard, by which a user may enter information; a memory 130 for storing the user's information, additional software for control of the processor and the like; a signal unit 150, such as an infra-red CODEC (coder/decoder), other modem, jack for an I/O lead etc, which allows the PDA to communicate with other devices for the exchange of information; a battery 160, which is preferably rechargeable, for powering the PDA 100; and a clock 170 for control of the timing of processor operations and for providing the PDA with a time-telling function.

Depending on how it is programmed, the processor 140 causes the display 110 to display a main image imparting to the user useful information concerning operation of the personal organiser and a background image, having a decorative function or imparting other information to the user. The processor 140 may cause the display 110 to display the main image alone, the background image alone or the background image and the main image simultaneously. The selection of whether to display the main image, the background image or both will in general depend on the usage of the PDA 100. Generally, however, the background image will be displayed alone or at the same time as the main image at least when the PDA is at the top level of a menu hierarchy.

Figure 4A:
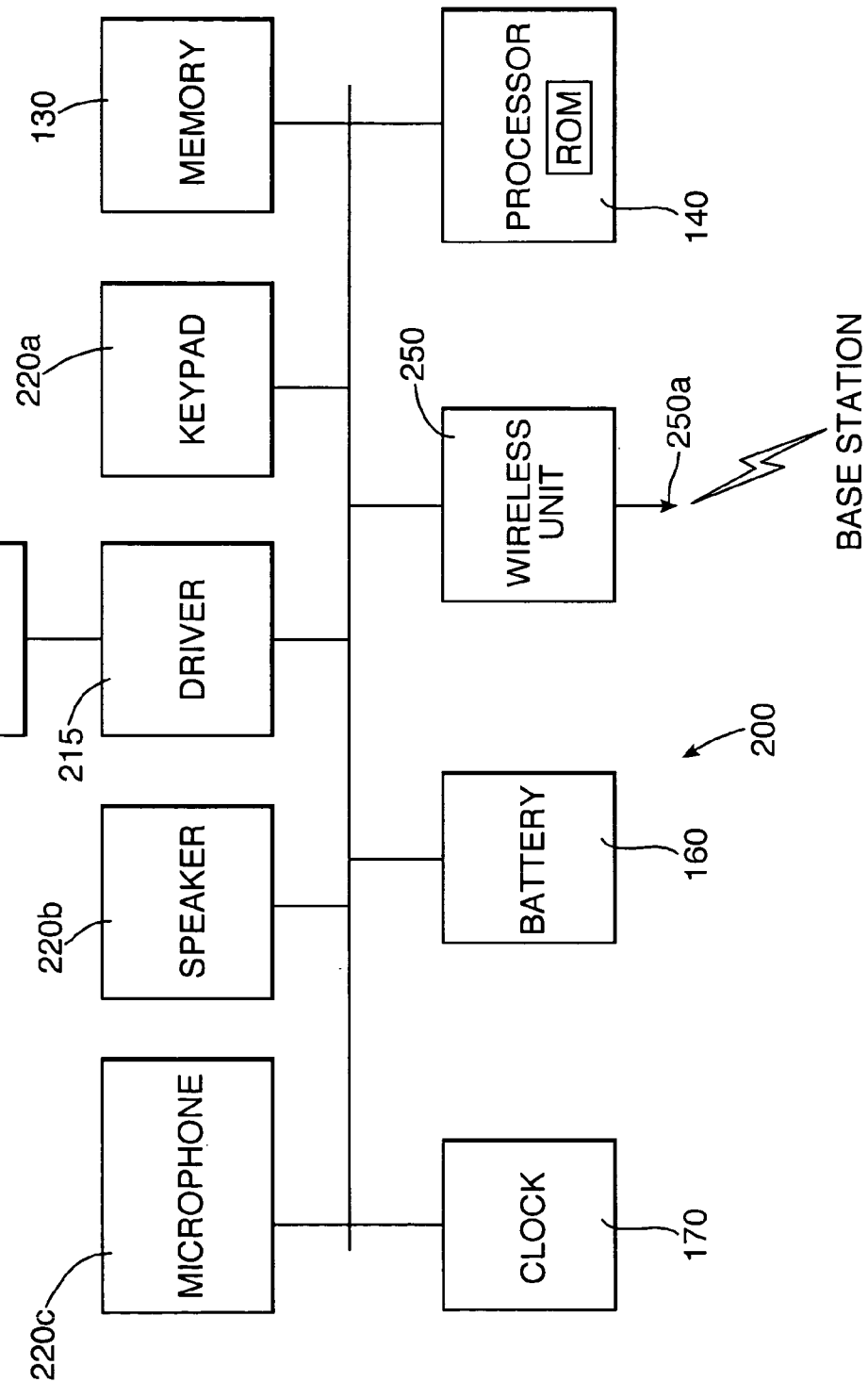
FIG. 4A is a block diagram of the architecture of a cellphone.

FIG. 4A is a block diagram of the architecture of a mobile phone 200 suitable for use in the present invention. The mobile phone 200 shares many of the components of the PDA 100 shown in FIG. 3, including the display 110; the memory 130; the processor 140; the battery 160 and the clock 170. However, instead of the generalised input unit 120, FIG. 4A illustrates a keypad 220*a* for user input; a speaker 220*b* for allowing the user to hear a caller's voice, information tones and other sounds; and a microphone 220*c*, by which the user's voice and other sounds can be transmitted during a phone call or stored in the memory 130.

In addition, instead of the generalised signal unit 150, the mobile phone 200 is provided with a wireless unit 250 with an aerial 250*a* for transmission of data to and reception of data from a base station using microwaves, radio waves and/or any other suitable means. The wireless unit may include a CODEC, a digital to analogue converter (DAC), an analogue to digital converter (ADC) and so forth.

Figure 1A:
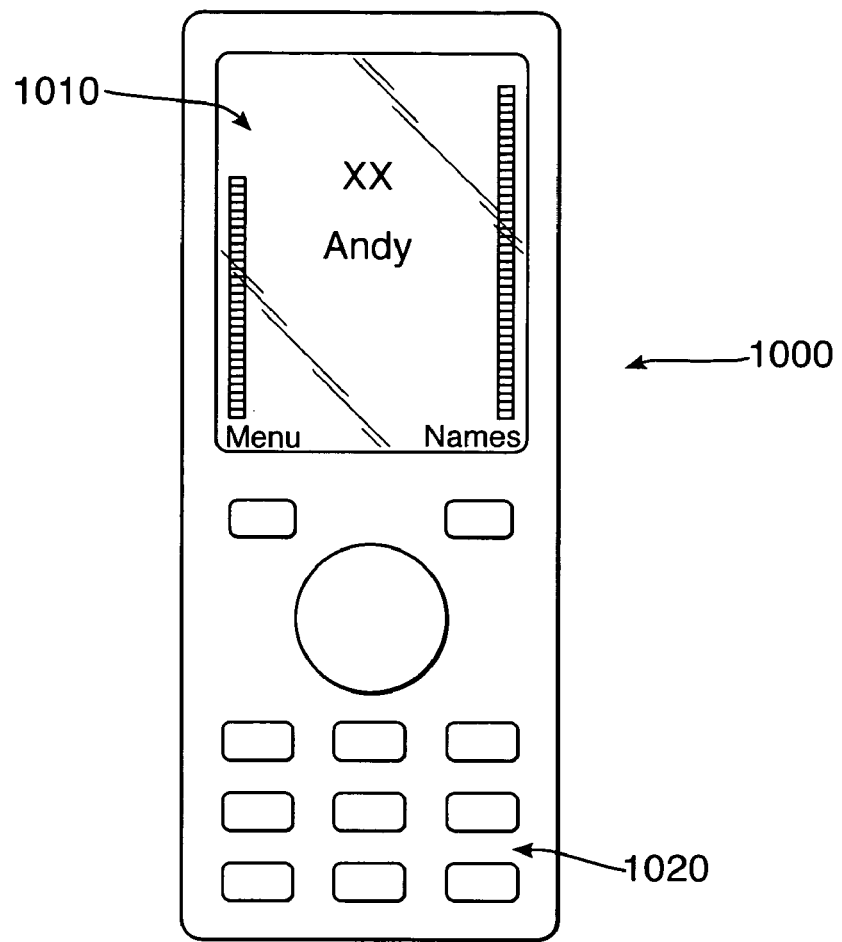
FIG. 1A represents a cellphone.
Figure 1B:
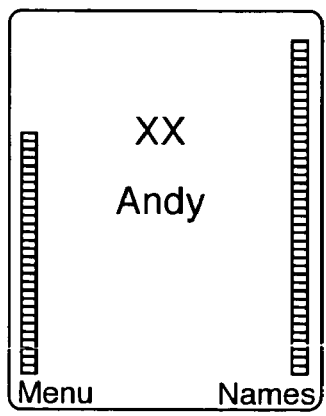
FIG. 1B shows a main image of the cellphone of FIG. 1A.
Figure 1C:
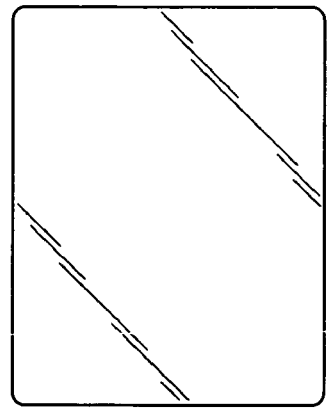
FIG. 1C shows a background image of the cellphone of FIG. 1A.
Figure 4B:
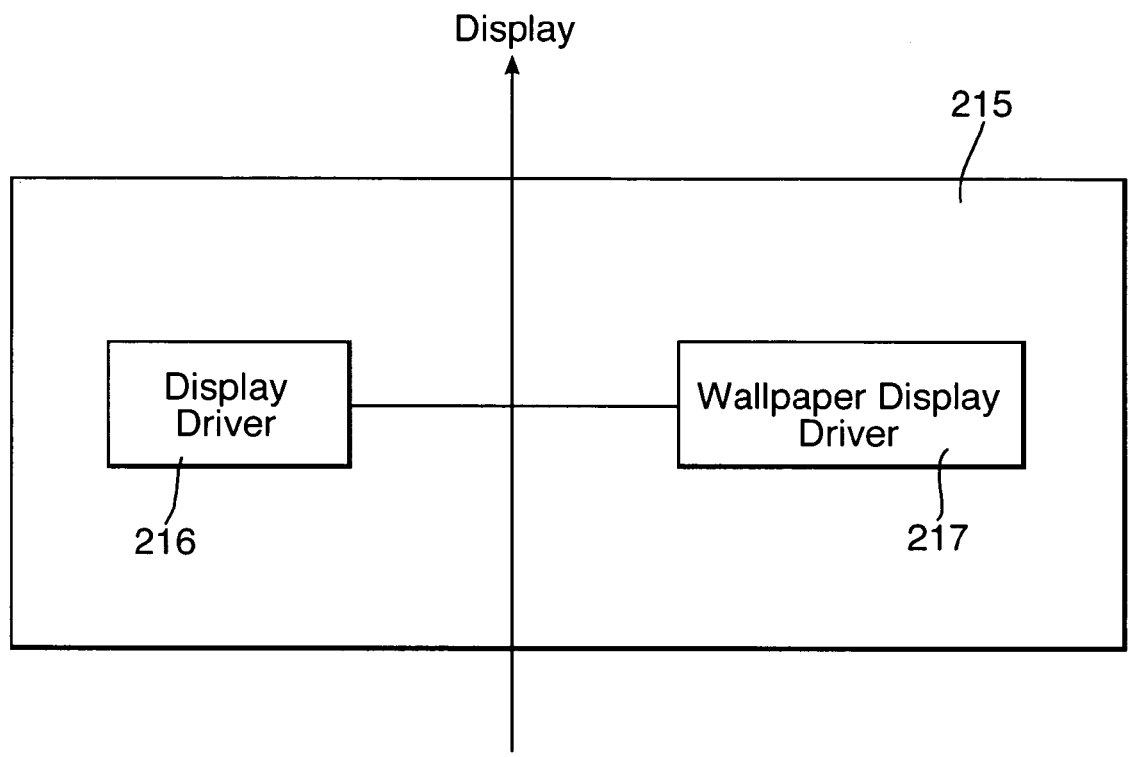
FIG. 4B is a representation of the driver in FIG. 4A.

The mobile phone 200 also includes a display driver 215, for control of the display 110. As shown in FIG. 4B, the display driver 215 includes a main display driver 216 and a background image display driver 217 termed a wallpaper driver. Each of the drivers includes a processor for processing data for output to the display 110 and corresponding display of the main and background images. Both display drivers are slaves to the master processor 140 and their operation is controlled by the master processor 140. However, they may include separate ROMs or be operated in accordance with programs stored in the memory 130. Thus, the master processor 140 instructs the main display driver 216 to output image data corresponding to a main image showing the information pertaining to the status of the mobile phone. For example, at the top level of a menu, the display will show the main image shown in FIG. 1B. However, this main image will change depending on the use of the mobile phone 200, including as the user scrolls through different menu options and as calls are made and received. Similarly, the master processor 140 instructs the wallpaper display driver 217 to output image data for the background display at appropriate times, such as When the user is at the top level of the menu hierarchy. If both the main image and the background image are to be displayed at the same time, the display driver 215 combines the image data output from the two display drivers 216, 217. It may do this by 'OR'ing the respective image data or overlaying the main image on the background image.

In one embodiment, the wallpaper display driver 217 may include a memory in which data for a plurality of background images is stored. Alternatively, a plurality of background images is stored in the memory 130.

Both the PDA 100 and the mobile phone 200 described above can be used in the present invention. It should be noted that the elements in the architectures shown in FIGS. 3, 4A and 4B are interchangeable and that the present invention is not limited to these specific embodiments of handheld mobile electronic communications devices. Thus, the present invention can be applied to PDAs also having the function of a mobile phone. Indeed, the present invention can be applied to any mobile electronic communications devices.

In preferred but non-limiting embodiments, devices of the present invention are adapted to deactivate in consequence of a certain event, as discussed above in relation to the background to the present invention. In addition, in the present invention the electronic device is able to display a plurality of different background images. Preferably data for these different background images is stored either in the memory 130 or, if provided, in the wallpaper display driver 217. However, this data may be stored external to the electronic device.

As in the prior art discussed above, a user is able to request a service provider to send a single image over the air to the mobile electronic communications device for subsequent display. However, in the present invention, images are transmitted to the device for storage in predetermined groups for subsequent use by the device.

Figure 5A:
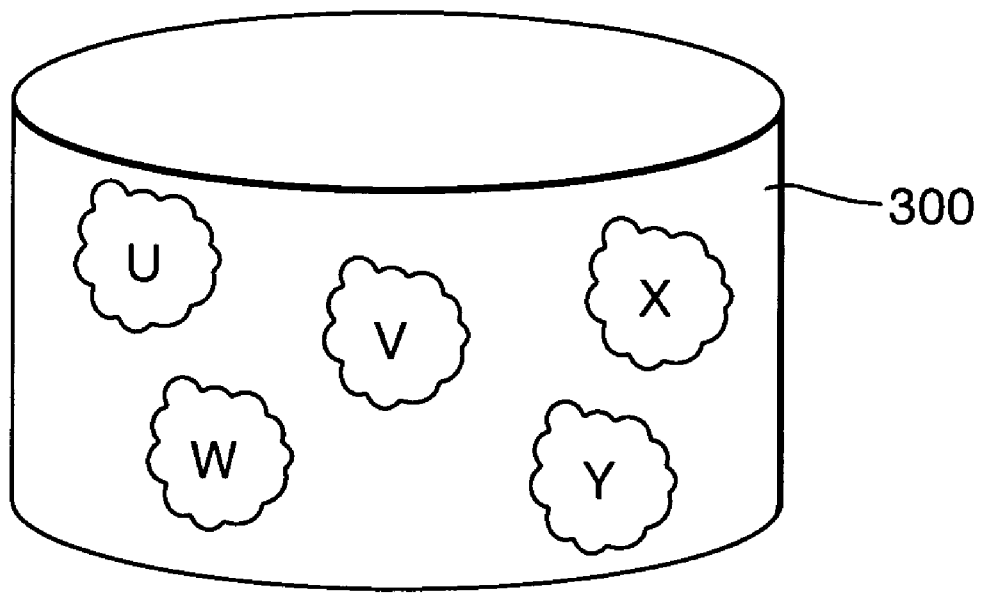
FIG. 5A is a representation of a server according to one embodiment of the present invention, which stores a plurality groups of images

In the embodiment shown in FIG. 5A, the content providing apparatus is a server 300 and stores a plurality of images, each of which is classified so that it belongs in one or more predetermined groups. Thus, FIG. 5A schematically shows that the server 130 classifies the images into groups U, V, W, X and Y. In this embodiment, group U relates to images respectively showing the artwork for the current top 10 singles in the electronic music sales chart of the service provider; group V relates to images of rap artists; group W relates to images showing various different cartoon superheroes; group X relates to images showing a particular cartoon superhero; and group Y relates to images of footballers.

Figure 5B:
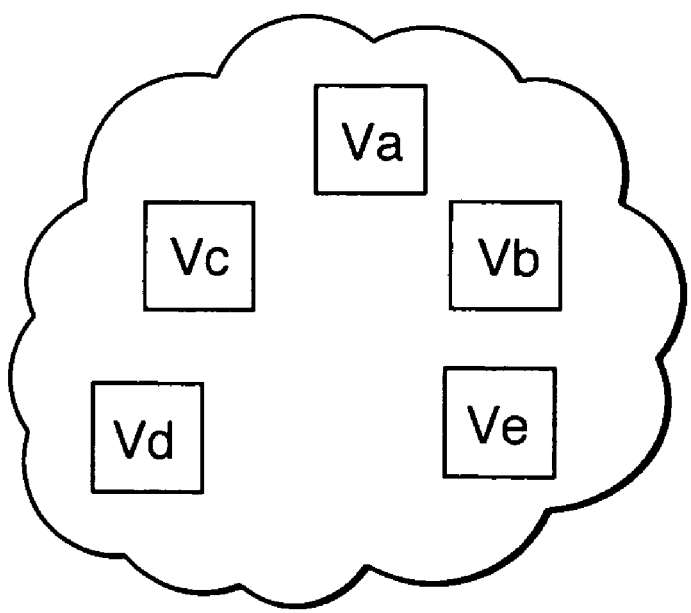
FIG. 5B represents one of the plurality of groups of images.

It is possible to store all the images in one group together, for example in a folder. This is illustrated in FIG. 5B, which shows that group V includes five images Va-Ve of rap artists. Alternatively, the images can be stored in any order in the server, and a directory for each group can list the address of each image in the group. Alternatively, one or more tags could be assigned to each image to indicate which group or groups it is associated with. Numerous other ways in which the images can be grouped will be evident to those skilled in the art and each is encompassed by the present invention.

It should be noted that the number of groups shown in FIG. 5A and the number of images in a group shown in FIG. 5B are non-limiting and that the images could be classified into fewer or more groups. Other possible examples of such groups include pictures of animals; paintings by a particular painter; the images in particular cartoon strip; related photographs; and so on. It will be clear to those skilled in the art that the possibilities for grouping images are almost limitless.

In addition, it should be recognised that where a content providing apparatus stores a multitude of images, any particular image can be classified as belonging in more than one group. For example, in the server 300 of FIG. 5A, if a rap artist has a single in the top 10 and the artwork for the single is an image of the artist, then the image could be included both in group U (which relates to images respectively showing the artwork for the current top 10 singles in a predetermined chart) and in group V (which relates to images of rap artists). Similarly, if one of the images held by the server 300 were to be a painting of a horse by the painter Stubbs, then the image could be included in both a group of images of animals and a group of paintings by Stubbs.

The classification of an image in an additional group can be achieved by storing an additional copy of the image in the additional group, by adding a directory entry for the image in the directory for the additional group, by appending a tag for the additional group to the image and so on. Images can be stored and accessed by the mobile electronic communications device in the same way as the server.

Of course, the images need not be stored by the server directly. Instead, they could be stored remotely for access by the server when required.

Figure 2:
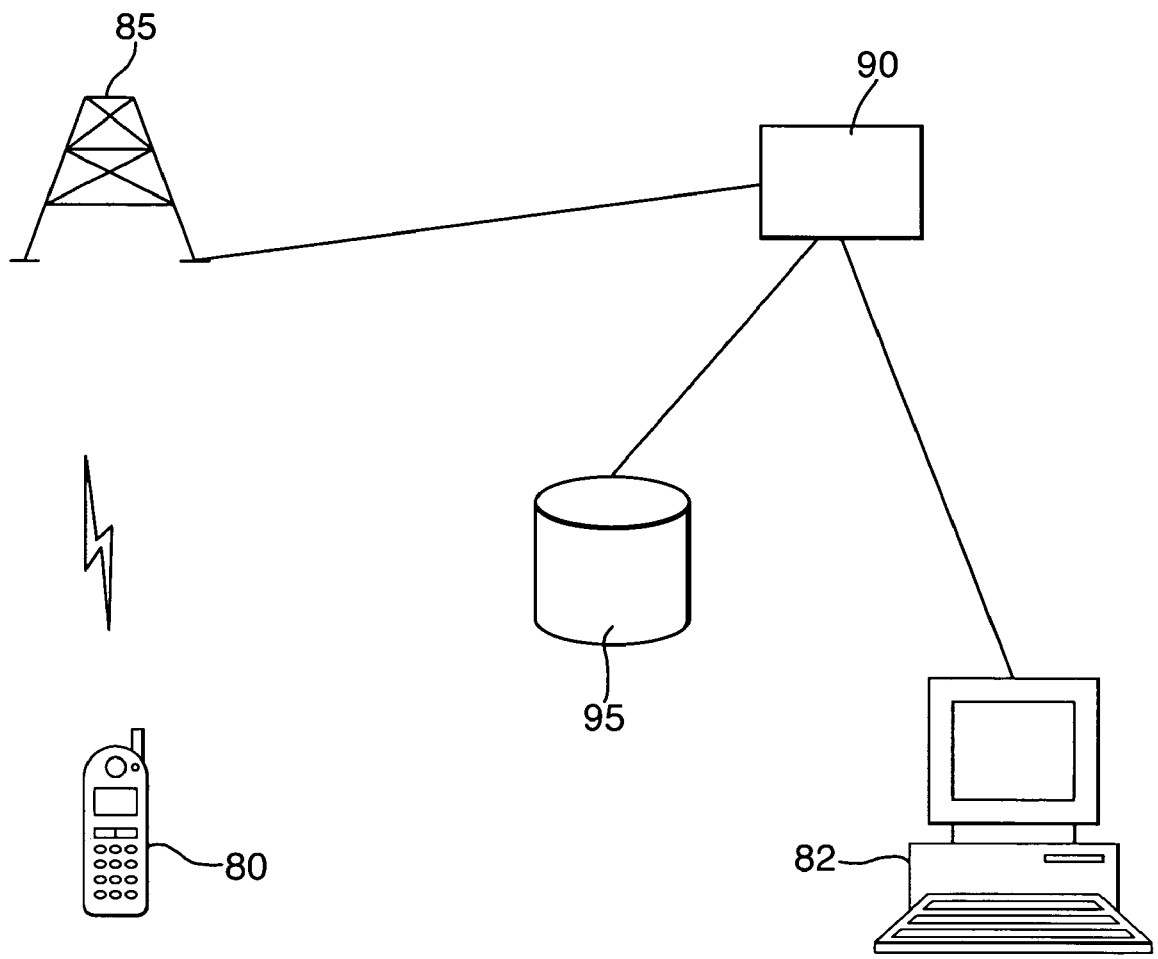
FIG. 2 is a schematic representation of a communications network suitable for transmitting digital content to a cellphone.
Figure 6:
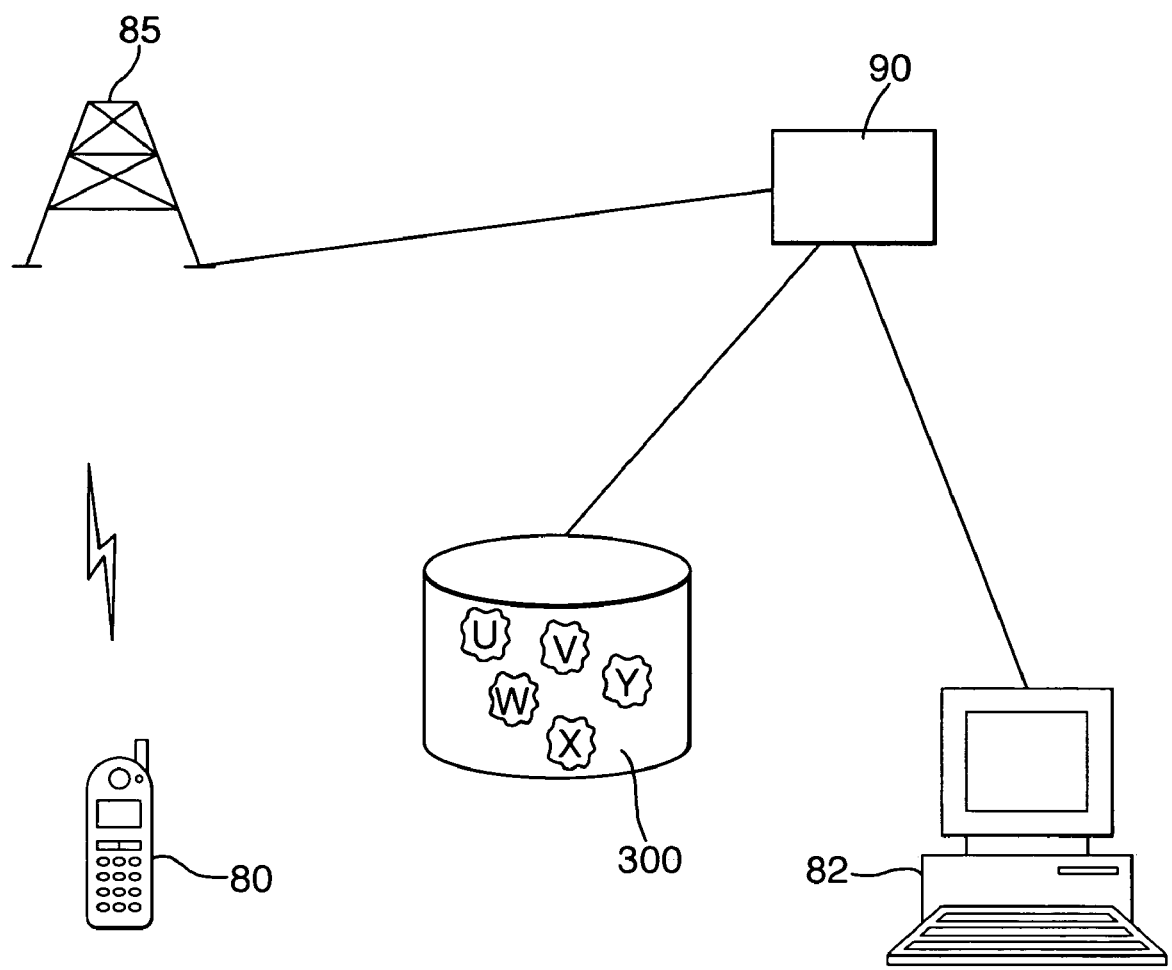
FIG. 6 is a schematic representation of a communications network including the server of FIG. 5A.

The network shown in FIG. 6 is suitable for practising the present invention. The network is the same as that shown in FIG. 2, except that server 95 is replaced with the server 300 of FIG. 5A. Thus, the server 300 has stored on it a plurality of images, which are classified by a service provider into various groups U-Y as discussed above. A user accesses the server 300 from his personal computer 82 over the Internet and retrieves information on the available groups from the server. The information relating to the groups can be of any desired level, for example ranging from a title of each group to a description of each of the images in the group to a thumbnail image of each of the images in the group. If thumbnail images are shown, they may be modified to include text indicating that the image is a preview copy. On the basis of the information retrieved, the user then makes a selection of one or more groups and sends a corresponding request over the Internet from the personal computer 82 to the server 300. The request includes an indication of the selected group or groups, an identification of the mobile phone 80 to which the images in the group or groups are to be sent and, preferably, payment details. The identification of the mobile phone 80 preferably includes both an identification of the make and model of the mobile phone, so that the image data can be sent in a format supported by the mobile phone, and the phone number associated with the mobile phone, so that images can be sent over the air direct to the mobile phone 80. The payment details can be the relevant details of a credit card held by the user or an authorisation to debit an account held by the user with the service provider.

On receipt of the request, the server 300 determines whether the payment details are acceptable and then transmits all the images in the group to the mobile phone 80. This is achieved by sending image data for each of the images in the appropriate format for the mobile phone to the base station 85, via the terrestrial communications centre 90. The base station 85 then transmits the data to the mobile phone 80 over the air, for example by frequency modulated microwaves. The data is received by the mobile phone 80 and stored in the memory. The software already stored by the mobile phone 80 then allows a selected one or more of the images to be displayed by the mobile phone 80, preferably as a background image (that is, as wallpaper). Of course, the image could be displayed as the only image.

Figure 7:
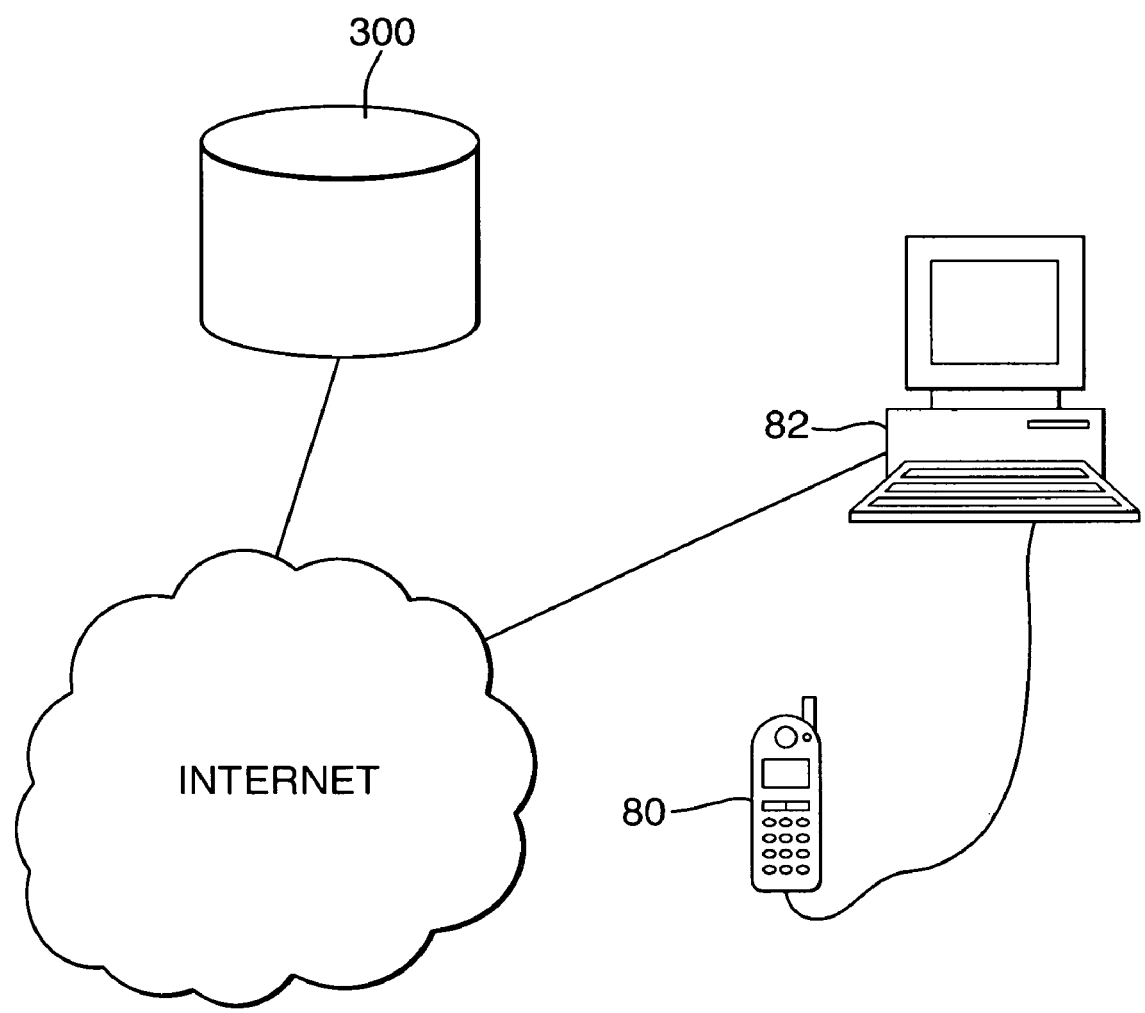
FIG. 7 is a schematic representation of another communications network including the server of FIG. 5A.

FIG. 7 shows another network suitable for use with the present invention. The network shown in FIG. 7 is similar to that shown in FIG. 6, and the request for transmission of a group of images continues to be made by the personal computer 82. However, the images are transmitted by the server 300 via the Internet to the personal computer 82 instead of the mobile phone 80. The images are then transmitted from the personal computer 82 to the mobile phone 80 by means of a connecting wire. As an alternative, the images are transmitted from the personal computer 82 to the mobile phone 80 by means of infrared, Bluetooth or another wireless transmission protocol. Thus, in this network there is no direct communication between the mobile phone 80 and the server 300.

It will be appreciated by those skilled in the art that mobile phones and other mobile electronic communications devices can be placed on the market already programmed to handle the display of images in groups according to the present invention. However, existing devices may not have this capability. Nonetheless, such existing devices can be programmed with this capability. In particular, a user can purchase suitable software for programming the device, for example in the form of a CD-ROM or other data carrier. The CD-ROM can be read by the personal computer 82, which can then be used to program the device using a physical interconnecting wire or by means of infrared, Bluetooth or another wireless transmission protocol. In one preferred embodiment, the CD-ROM will have the necessary software for programming a large range of devices. On loading the CD-ROM, the user will be guided to select the appropriate make and model of the mobile electronic communications device, and the personal computer 82 will use the selection to program the device appropriately.

Of course, other means of programming mobile electronic communications devices will be apparent to those skilled in the art, including over the air, similar to the network in FIG. 6 or by using a programming card that is inserted in the mobile electronic communications device. For example, it is known to replace the SIM card in a mobile phone with a programming card, which then stores the relevant software on the memory 130 of the device.

Figure 8:
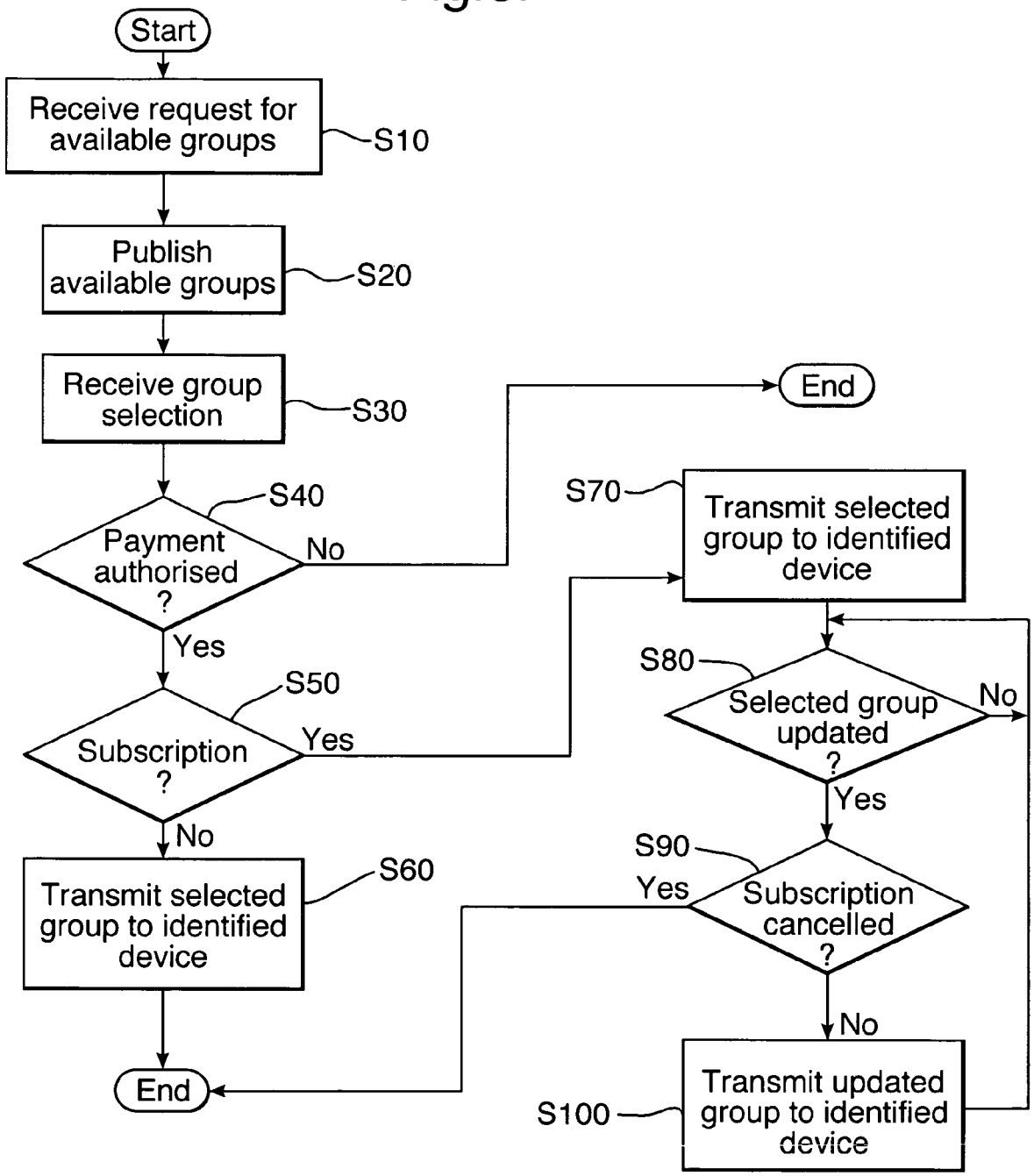
FIG. 8 is a flowchart of a method of one embodiment of the invention.

It will also be recognised that the present invention lends itself to the provision of subscription services. One method of operating the server 300 in accordance with the present invention, which method includes the possibility of such subscription services, is shown in FIG. 8. In step S10 of FIG. 8, the server 300 receives a request, either direct from a mobile phone 80 over the air or using a personal computer 82 via the Internet, to send to a user information on the available groups of images available for downloading. If sent direct from a phone, the request can be sent using WAP, SMS, MMS or another protocol. The server then publishes the available information to the user by sending relevant information in step S20. The information can be sent to a computer or a mobile electronic communications device (such as a mobile phone) as requested. As discussed above, the information provided to the user can take many different forms and the method could further include a number of distinct information providing sub-steps. For example, the user can first be sent a list of available groups. On further request, the user can be sent a description of each image in the group, and on yet further request the user can be sent a thumbnail preview image of each or selected images in the group. However, the precise way in which this group information is requested and published is not essential to the present invention.

After receiving the group information he requires, the user makes a selection of which group he requires to be sent to him and sends a request to the server 300, together with payment data and details of the make and model of the mobile electronic communications device which is to display the images. This request is received by the server 300 in step S30. In step S40 it is determined whether the user's payment for transmission of the group is authorised, for example by performing a check with a credit authorisation service or by determining whether an account held by the user with the service provider has sufficient funds or credit for the payment. If payment authorisation fails, then the user is informed and the process ends.

In one example, the user could select group U, which relates to images respectively showing the artwork for the current top 10 singles in the electronic music sales chart of the service provider. This group of images could be updated every week. If payment is authorised, then in step S50 the server 300 determines whether the request for transmission of group U is a request for a subscription in which the updated group is transmitted each week or a request for a one-off transmission of the current group.

If the request is a request for a one-off transmission, then in step S60 the server simply sends the data for each of the images currently in the group to the user in the appropriate format for the mobile electronic communications device. The data can be sent direct to the device over the air or to the user's personal computer for subsequent downloading to the device. In the latter case, the request need not include details of the make and model of the device (or the device's phone number, if there is one) and the server can send the image data in a variety of formats. The user can then download the data onto the device, or even onto several different devices, and select the appropriate format for the or each device at that time. The process then ends.

On the other hand, if the request is for a subscription to the group then in step S70 the server sends the data for each of the images currently in the group to the user, as in step S60. However, the server 300 subsequently periodically checks whether the group has been updated in step S80 and, if so, in step S90 then checks whether the subscription is still effective. The subscription may no longer be effective for example because the user has cancelled the subscription or because the payment is no longer authorised. If the subscription is no longer effective, then the process ends. Otherwise, the server 300 sends the data for the images in the updated group to the user in step S100, before returning to step S80.

It should be appreciated that the method shown in FIG. 8 is exemplary only and the various different methods and changes in the order of steps is possible.

In addition, the transmission of data for the images in the updated group can be performed in a number of ways. For example, the server can transmit data for all the images in the updated group, the group being stored by the mobile electronic communications device being replaced in its entirety. Alternatively, the server can determine which of the images in the group have been added and transmit only those images. Thus, the number of the images in the group continues to grow until the user manually deletes them from the mobile electronic communications device or the memory in the mobile electronic communications device is full. In that event, images can be deleted from the memory on a FIFO, FILO or LIFO basis or the mobile electronic communications device can refuse to accept the new images. In another alternative, if some images in the group are unchanged and others are replaced, then the server can send data instructing the replacement of only specific images in the group stored by the mobile electronic communications device. In yet another alternative, the server can request from the device an indication of which images are already stored and then transmit only those images in the predetermined group that are not already stored by the device. If the server detects that the device already stores one of the images in the updated group but that this image is stored by the device in a different group, the server can instruct the device to copy or transfer the image to the updated group. Numerous other methods of updating groups on the server and on the mobile electronic communications device will be obvious to those skilled in the art and each is encompassed by the present invention.

Figure 9:
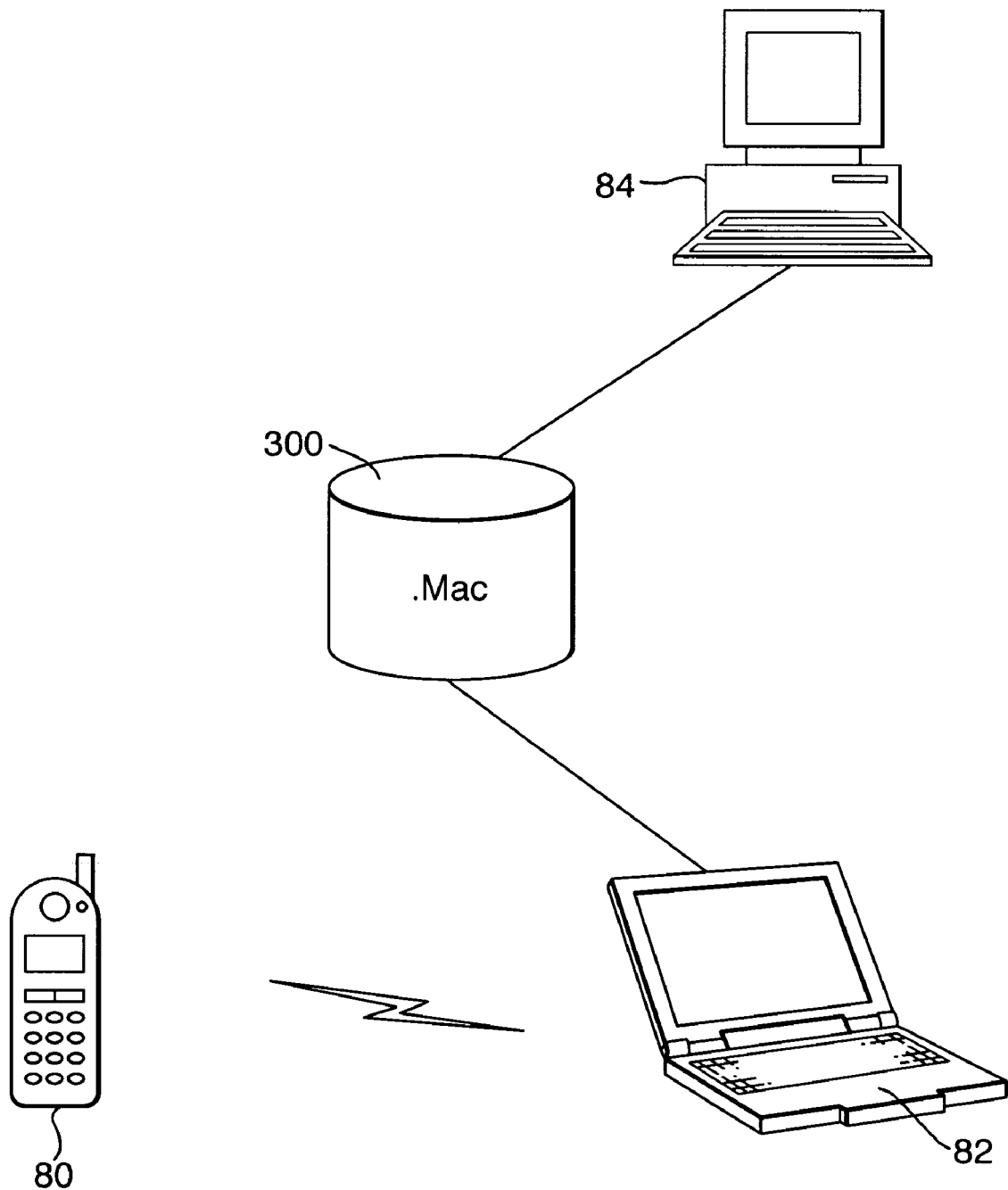
FIG. 9 is a schematic representation of a further communications network including the server of FIG. 5A.

It should be appreciated that the present invention is not limited to groups of images selected by a content service provider and stored on a server owned and controlled by that content service provider. Users may also create groups of images and store and save them for subsequent access and retrieval by third parties, such as their relatives, or even themselves. For example, FIG. 9 shows a network where a first personal computer 82 is connected to a .Mac server. The first personal computer 82 is also connected to a mobile electronic communications device (in this case a telephone 80) by means of a wireless connection. In FIG. 9 the personal computer 82 is represented as a laptop computer. The server 300 is also connected to a second personal computer 84. As before, connections between the server and the two personal computers 82 and 84 may, for example, be direct or over the Internet. In this embodiment, the user of the second personal computer 84 is able to create a plurality of images and store them as a group on the server 300 for publication to third parties. Thus, when the user of the laptop 82 logs on to the .Mac server 300 he is able to retrieve the group of images created by the user of the second personal computer 84. Subsequently, the user of the laptop 82 can transfer the group of images to his mobile electronic communications device using the wireless connection. The images in the group can then be displayed as background images on the mobile electronic communications device.

Figure 10:
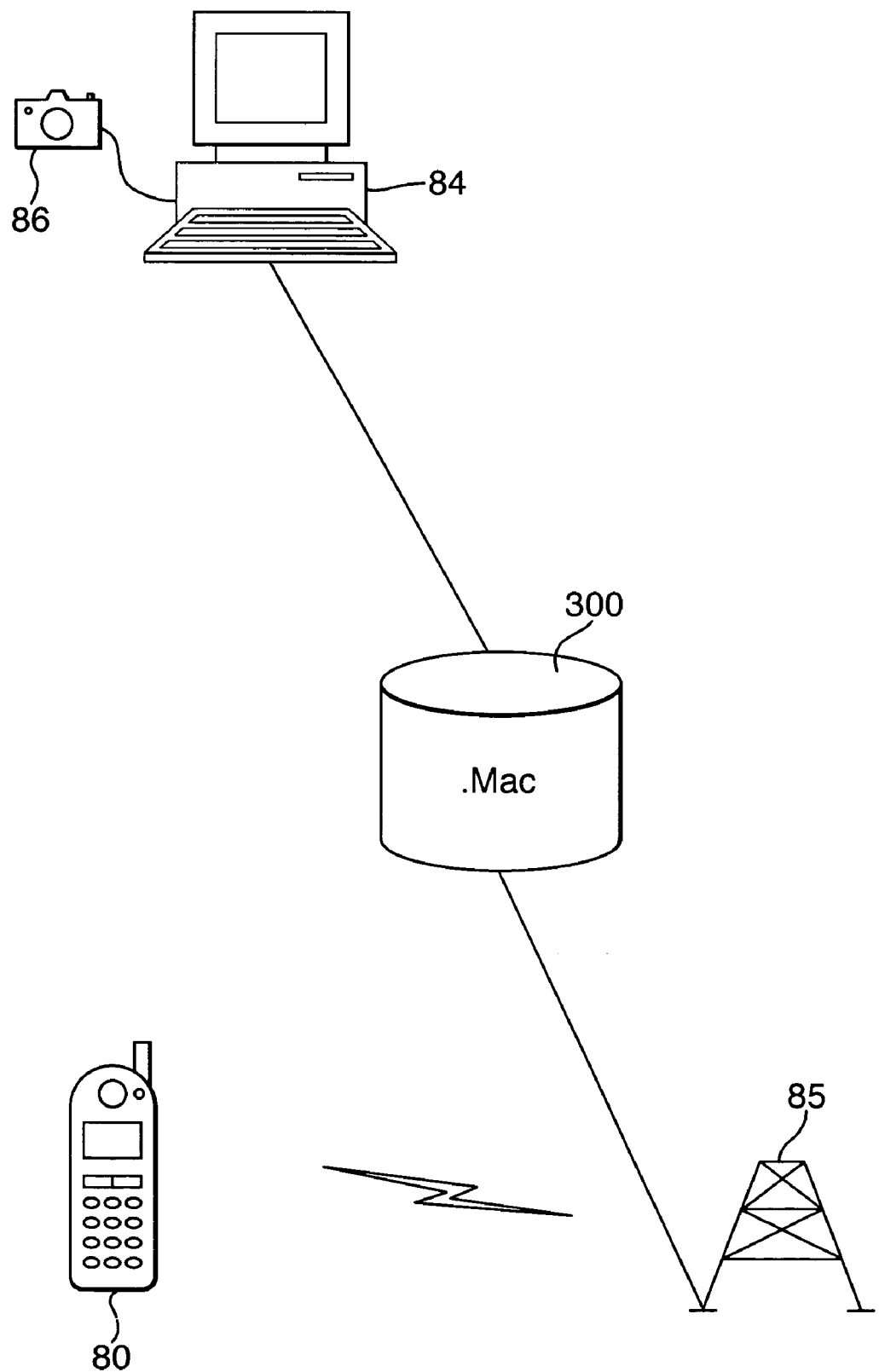
FIG. 10 is a schematic representation of another communications network including the server of FIG. 5A.

FIG. 10 shows another network suitable for use in the present invention. In FIG. 10, a digital camera 86 is connected to the personal computer 84, which is in turn again connected to the .Mac server 300. The user of the digital camera 86 transfers images taken by the camera to the personal computer 84 and then uploads the images as a group from the personal computer 84 to the server 300 for publication. A user of the mobile phone 80 receives information about the published group direct from the server 300 over the air without the intermediary of a further computer 82. If the user requests that the group is transmitted, then the image data for the group is sent to the mobile phone 80. Of course, if desired, the user of the phone 80 could request and receive the group using an intermediary computer 82. Similarly, a user could use a camera phone instead of the digital camera 86. In that case, it would be possible to transmit the image data for a group direct to the server 300 for subsequent publication to third parties.

Figure 11:
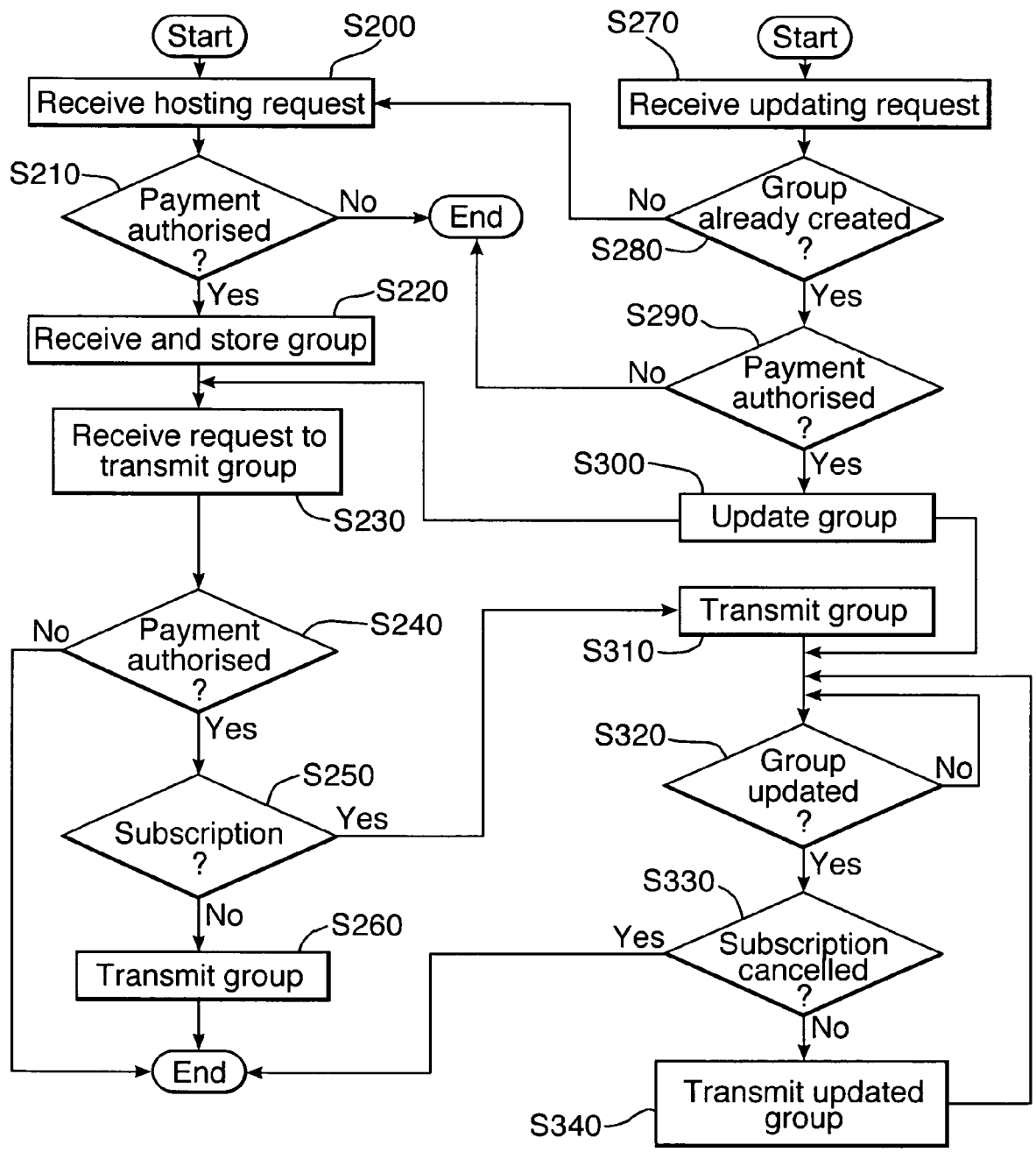
FIG. 11 is a flowchart of a method of another embodiment of the invention.

An example of a method in which the server 300 accepts images from users for storage, publication and transmission to third parties is shown in FIG. 11. In FIG. 11, the server receives a request from a first user to host a new group of images in step S200. Preferably, the request includes an identification of the first user as well as payment details. If payment is not authorised in step S210, then the process ends. Otherwise, the server 300 receives and stores the group of images from the first user in step S220. In this step, all relevant information relating to the group of images is received from the first user. In addition, the first user is given confirmation that his group of images has been stored and is preferably provided with an indication of how the group can be accessed. The existence of the group can then be published by the server 300, or otherwise made available to third parties. For example, the first user may inform friends, relatives and colleagues that he has uploaded the group of images by e-mail and include a unique resource locator (URL) link in the e-mail, which will direct them to an appropriate web page for downloading the group. Alternatively, the server may actively publish that the new group of images has been uploaded to a specified set of second users.

Preferably, the first user is given preferential access to the group and is able to update the images in the group at any time. For example, he may be able to delete images from the group, to add images to the group or to replace images in the group. If the first user decides to update the images in the group, he sends a corresponding request to the server 300, which is received in step S270. On receipt of the request, the server 300 establishes whether the group has indeed already been created and, if not, the process is redirected to step S200. However, if in step S280 the server finds that the group has already been created, it proceeds to step S290 in which the first user's payment details are checked for authorisation. If payment is not authorised in step S290, then the process ends. Otherwise, the server 300 proceeds to update the group.

In step S230, the server 300 receives a request from a second user to send the group of images uploaded by the first user. This request may be as a result of the server publishing that the group is available in a similar way to that described above in respect of FIG. 8 or by the second-user simply clicking on the URL sent to him by the first user. Again, the request preferably includes payment data and details of the make and model of the mobile electronic communications device. This request is received by the server 300 in step S230. In step S240 it is determined whether the user's payment for transmission of the group is authorised. If payment fails, then the user is informed and the process ends.

If payment is authorised, then in step S250 the server 300 determines whether the request is a request for a subscription in which an updated group is transmitted at predetermined intervals or a request for a one-off transmission of the current group. If the request is for a subscription, the predetermined interval may be, for example, daily, weekly, monthly or simply each time the group is updated. If the predetermined regularity is daily or less frequent, then the updated images for the group can be updated overnight.

If the request is a request for a one-off transmission, then in step S260 the server simply sends the data for each of the images currently in the group to the user in the appropriate format for the mobile electronic communications device. Again, the data can be sent direct to the device over the air or to the user's personal computer for subsequent downloading to the device. In the latter case, the request need not include details of the make and model of the device (or the device's phone number, if there is one) and the server can send the image data in a variety of formats. The user can then download the data onto the device, or even onto several different devices, and select the appropriate format for the or each device at that time. The process then ends. If the server 300 actively publishes the uploading of a group of images to specified second users, it may also actively publish that the group has been uploaded.

On the other hand, if the request is for a subscription to the group then in step S310 the server 300 sends the data for each of the images currently in the group to the requesting second user, as in step S260. However, the server 300 subsequently periodically checks with the predetermined regularity whether the group has been updated in step S320 and, if so, in step S330 then checks whether the subscription is still effective. If the subscription is no longer effective, then the process ends. Otherwise, the server 300 sends the data for the images in the updated group to the user in step S340, before returning to step S320.

If the predetermined interval with which the server checks whether the group has been updated is sufficiently short, then it will appear to the second user that he is always sent the updated group immediately it has been updated.

To effect the above-described functionality, the server 300 may comprise a receiving component or module for receiving information such as hosting and publication requests, a transmitting component or module for transmitting groups of images or other information, and an updating component or module for updating groups of images.

Of course, the foregoing embodiment is non-limiting and many changes are possible. For example, there is no need for the second user to request that the first user's group of images be transmitted to him. Rather, when or at any time after he requests the server to host a group of images, the first user can enter details of second users to whom the group should be sent. The server can automatically send the group to the selected second users. Each time the group is updated, the server can automatically send the updated group to the selected second users.

In addition, the payment checks indicated in FIG. 11 (as well as the other figures) are optional. Instead, some or all of the payment checking steps can be removed so that none or only selected first and/or second users are charged.

As an alternative or in addition, password security may be implemented. For example, a first user, who publishes a group of images, may password protect the group and then send the password to trusted third parties, such as friends and family members. The third parties will then be required to enter the password before they are allowed access to, or are sent images from, the group.

In one example, the first user may be travelling around the world for an extended period. He uploads photographs he has taken in each specific region of the world as one respective group of images, the group being given the name of the region, such as Pacific Islands. On uploading the images, he sends an email to family and friends with a URL for the group. When a member of his family clicks on the URL, he is directed to a web page allowing him to download the photographs from the first user taken in the Pacific Islands, for example for display as background images on his mobile phone.

In a preferred embodiment; the second user is able to view the images in the group by scrolling through them one by one. As the first user travels more around the Pacific Islands and takes further pictures, he updates the group and the second user is sent the updated images. Each time the first user updates the group of images, the updated group is sent automatically to the family member's phone. When the first user travels to another part of the world, he creates a new group of images for sending to second users. Once they have received the second group of images, the second users are able to decide whether to display images from the first group, the second group or both.

In preferred, but non-limiting embodiments, each time a predetermined event relating to operation of the device occurs, a different background image from a selected group of images is automatically selected for display. In more preferred embodiments, devices of the present invention are adapted to deactivate in consequence of a certain event, as discussed above in relation to the background to the present invention. However, other events such as the receipt of a phone call or message are also suitable triggers for changing the background image to be displayed.

Figure 12:
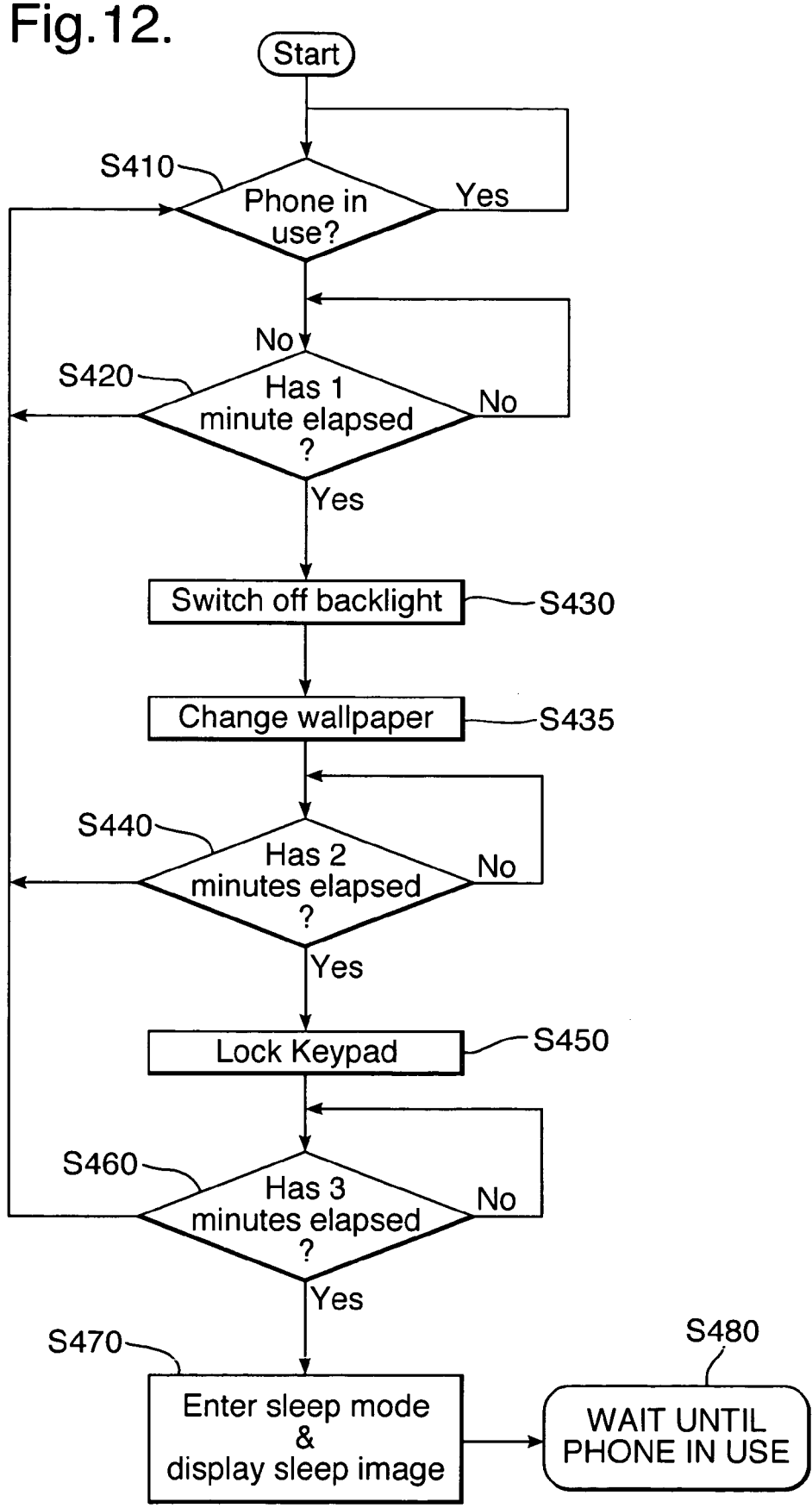
FIG. 12 is a flowchart representing a further aspect of the invention.

FIG. 12 shows an exemplary embodiment of the present invention and, specifically, a method of operating a mobile phone 200, in which the display comprises an LCD with a backlight. At step S410 the processor 140 continually determines whether the mobile phone 200 is in use, at which time the backlight is switched on. When the processor determines that the mobile phone is not in use, it begins a timer to establish whether the phone has been out of use for one minute. At this time, the phone preferably displays both the main image and the background image simultaneously, with the backlight switched on for a bright display. If the phone is used during the one minute period, the processor returns to step S410, in which the back light is switched on. However, once the time elapsed since the phone was last used exceeds one minute, the processor moves from step S420 to step S430, in which the backlight of the display is turned off.

Immediately after step S430, the processor moves to step S435, in which it causes the displayed background image to change to another image in the preselected group. Thus, the display continues to display the same main image but overlaid on a different background image from the preselected group. At this time, the display is driven such that it still displays both the main image and the new background image simultaneously. However, since the backlight is switched off, the display is more difficult to see. Subsequently, in step S440 the processor sets a timer to establish whether the phone has been out of use for a further two minutes. If the phone is used at any time in this period, for example because an incoming call is received or a button on the keypad is depressed, the processor 140 returns to step S410, in which the backlight is switched on and a main image is overlaid on the new background image.

Otherwise, the processor proceeds to step S450, in which it locks the keypad in a similar manner to that described above in respect of the background of the present invention. At this time the main image may change to inform the user that the keypad has been locked. However, the new background image remains unchanged and the backlight remains switched off.

Subsequently, the processor proceeds to step S460 in which it sets a timer to establish whether the phone has been out of use for a further three minutes. If the phone is used at any time in this period, the processor 140 returns to step S410, in which the backlight is switched on and an appropriate main image is displayed. Otherwise, the processor proceeds to step S470 in which the phone enters a sleep mode. In the sleep mode, a sleep image is displayed instead of both the main and background images. Alternatively, no image is displayed in the sleep mode. The processor then waits for the phone to be used again before initiating any further action.

Accordingly, each time the phone is deactivated by switching off the backlight at step S430, the background image that is displayed by the phone is changed in step S435 to another one in the preselected group. Consequently, the user is automatically shown a new background image for each new usage of the phone, when the backlight is switched on. This is an attractive feature for users, and is of significant novelty value. For example, the phone may have stored in it several tens or even hundreds of different background images from which the processor may select. Consequently, the image presented to the user is consistently changed in an attractive manner.

Of course, the method shown in FIG. 12 is not limiting. For example, the backlight may be switched on again after step S450, to clearly indicate to the user that the keypad is locked. At this time, the user will be confronted by a new background image—namely, the wallpaper selected by the processor in step S435. Subsequently, the light may be turned off before the sleep mode is entered.

In addition, the wallpaper changing step S435 may take place at other suitable times. For example, the wallpaper could instead be changed immediately after the keypad locking step S450. If the backlight is illuminated after the keypad locking step S450, then the background image could be changed before the backlight is illuminated, so that the backlit image displayed to the user is changed. Of course, the wallpaper changing step S435 could take place after any one or more deactivation steps, such as the sleep mode entering step S470, turning off the phone or other deactivations.

If provided, the automatic wallpaper changing step need not take place after a deactivation step takes place. Instead or as well, it could occur each time any one or more predetermined levels in menu hierarchy are entered, or each time a phone call, short messaging service (SMS) message or multimedia messaging service (MMS) message is received. Thus, a wallpaper changing step could be programmed to take place after each of steps S430, S450 and S470, as well as each time a phone call is received, for example.

The next background image to be displayed can be selected in a number of ways. For example, if the mobile phone or other mobile electronic communications device stores a several groups of images, then one group can be selected and the processor will display the images in the group in strict rotation. This method of selecting background images is attractive if the background images are ordered in some way, for example if the background images are holiday pictures of a first user, or if they are pictures showing the presidents of the United States, they can be displayed in chronological order. As an alternative, the images in a group could be selected by the processor 140 (or display driver 215 or wallpaper display driver 217) at random. This may be more attractive for other types of background image, such as patterns. Either method is attractive if the group is, for example, a regularly updated group of photographs of a first user travelling around the world for an extended period. Thus, a second user who is unaware that the group has been updated could unexpectedly view a new image from the updated group. Of course, the processor could be controlled to display automatically new images from an updated group or images from a new group in preference to images previously stored by the mobile electronic communications device.

As another example, if a mobile phone stores a group of "general knowledge" images and this is selected for display, then the processor may select a "question" background image at random, and then select the corresponding "answer" background image as the next wallpaper to be displayed. Subsequently, another "question" background image would be randomly selected, and so on. Of course, images could be selected from more than one group at a time. Thus, the user could select that images from any two or more groups are to be displayed as the wallpaper. In another alternative, the user can be allowed to determine which images from all the groups can be selected by the processor 140, or to exclude certain images from selection by the processor 140. Effectively then, the user may edit which images stored on the mobile phone or other mobile electronic communications device are included in which group.

In the exemplary method shown in FIG. 12, the newly selected background image is displayed immediately in step S435. However, this is not essential. For example, it would be possible instead to display the newly selected background image as wallpaper only when the device is next used, for example by a user depressing a button on the keypad. Effectively, step S435 would be split into two steps, namely a wallpaper selection step occurring immediately after the predetermined event and a wallpaper display step occurring after that, for example when the phone is next used.

Similarly, step S435 occurs immediately after step S430. However, if desired it could occur at any predetermined time, for example one minute, after step S430. In that event, the predetermined event causing automatic selection of a new background image would be a combination of all the steps leading to step S430 and, in addition, the elapsing of a predetermined time without the phone being used. If the phone were to be used in the one minute period after step S430, no new background image would be selected.

It will be apparent to those skilled in the art that there are many permutations of the time for selecting the new wallpaper image and for displaying the newly selected wallpaper image. In particular, there are many possible predetermined events in consequence of which a new background image can be automatically selected for display as wallpaper. In a preferred embodiment, the user is able to select the predetermined events that will cause new background images to be automatically selected.

Accordingly, this aspect of the present invention is particularly attractive to users seeking improved functionality of their mobile phones or other mobile electronic communications devices. It is envisaged that the present invention will be particularly attractive to younger users, who will wish to show and compare with others the improved functionality of their mobile phones, as well as the background images displayed by their phones. In one embodiment, two users could each download a group of "game" images and set their phones to randomly display the "game" images. The changing background images displayed by their respective phones could then be used to play a game such as snap or trumps (in which, as an example, an automobile is displayed with its top speed and the user displaying the top speed wins).

FIGS. 3 and 4A both show the respective electronic device as including a memory 130 and it is preferred that software controlling the device to carry out the method of the present invention is stored in this memory. Alternatively, the processor may be controlled to carry out the method of the present invention by an instruction set stored in the ROM or hard-wired in the device.

In one embodiment, the appropriate instruction set (program) for control of the processor in accordance with the present invention is stored in the electronic device on manufacture, or at least before sale of the device. However, the present invention comprises not only an electronic device and method as described above, it also includes a communications system and a method comprising transmitting to the electronic device software for controlling the device.

In the event that the mobile phone is not programmed in accordance with the present invention, a user may make a request to a service provider to transmit or download the appropriate software for his phone. The service provider, who for example may be an Internet service provider or a mobile phone signal carrier, may then transmit the software for use by the phone. Preferably, transmission is only effected for a fee or some other consideration.

As discussed above, the transaction may take place in a number of different ways. For example, the user may simply send an SMS text message over the air via a base station to the service provider to send the software. Typically, the service provider will require credit card or other payment details, so that a fee can be collected, and details of the make and model of the mobile phone so that the appropriate software can be sent. The service provider may then transmit the appropriate software over the air as a series of data packets to the mobile phone 200 for storage in the memory 130. The software will then control the phone to operate in accordance with the present invention.

Alternatively, the user may make the request to the service provider over the Internet using a personal computer such as a laptop, with details of the mobile electronic communications device, including the phone number allocated to it (if any) so that the software can be sent to the correct device. As an alternative, irrespective of whether the request is made from the mobile electronic communications device or the personal computer, the software may be sent to the computer for subsequent uploading to the mobile electronic communications device. This has the advantage that the transmission of the software to the user is performed using a terrestrial telephone network, which is in general considerably less expensive than the airtime that would be required for transmission direct to the mobile electronic communications device via a base station. Subsequently, the user can transfer the software from the computer over a wireless LAN, using Bluetooth or another transmission protocol or using a physical lead to the mobile electronic communications device, at no additional cost.

Preferably, the mobile electronic communications device may support one or more of a number of different formats for display, such as the .tif, .gif and .jpg formats. Depending on the formats supported by the mobile electronic communications device, the computer converts the images as necessary before sending them to the phone. Alternatively, the server may send a request for an identification of an image format by which the device can display images and, when it has received a response, convert the images in the group into the determined format and transmit the converted images to the device.

Figure 13:
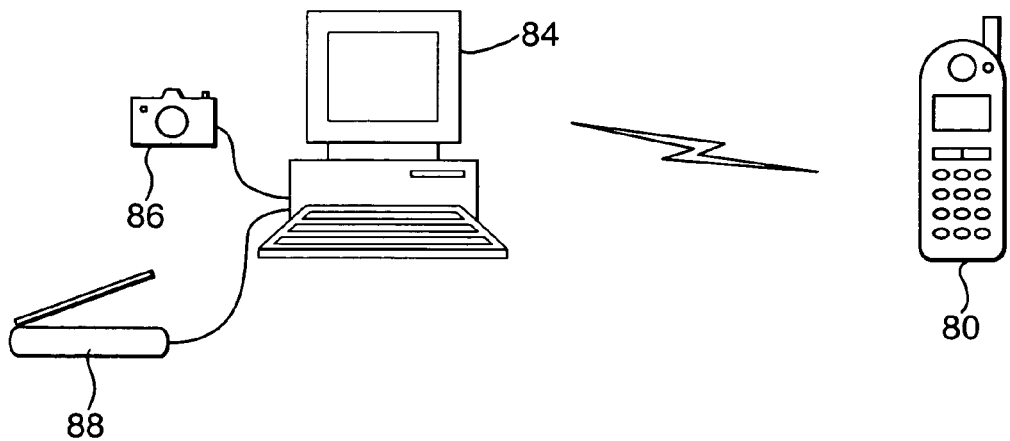
FIG. 13 is a schematic representation of a local area network in accordance with the present invention.
Figure 14:
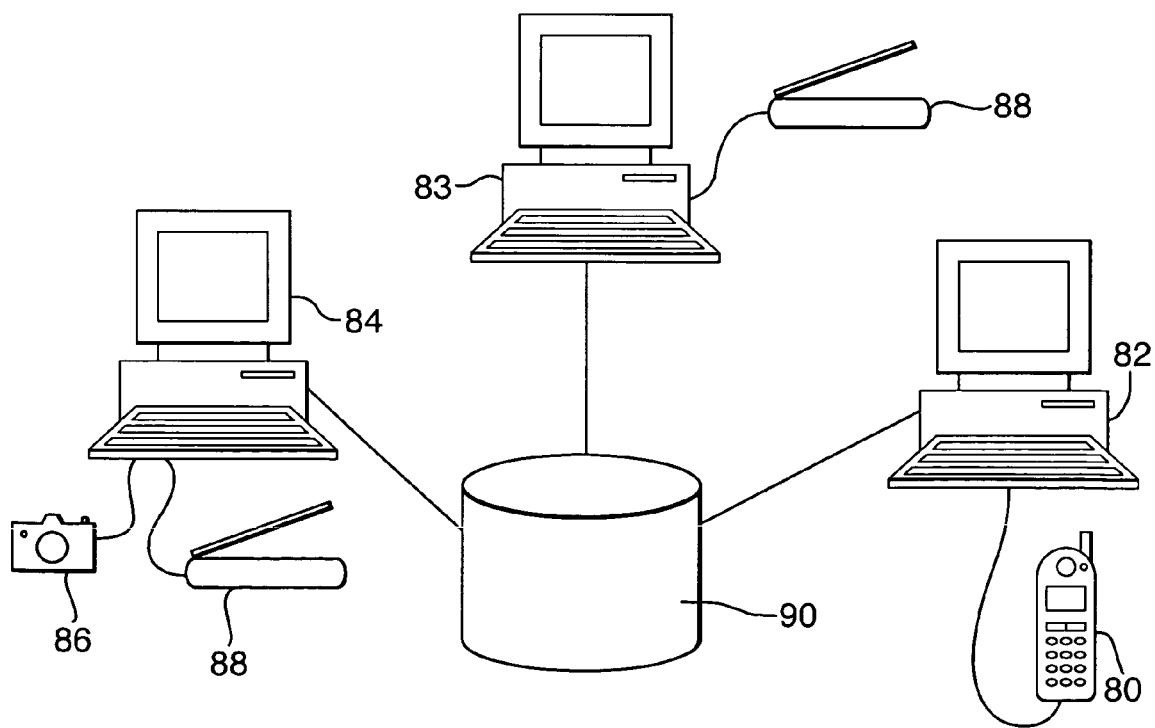
FIG. 14 is a schematic representation of another local area network in accordance with the present invention.

In the foregoing description, service providers such as Internet service providers or signal carriers send groups of images to an mobile electronic communications device, for example for use as background images or for other forms of display. However, it is also possible to practise the present invention without using a third party service provider or the Internet. For example, FIGS. 13 and 14 show two different local area networks (LANs). In FIG. 13 a personal computer 84 is connected to a digital camera1 86 and a digital scanner 88, by means of which digital images can be input. In addition, the computer 84 may have various graphics packages that allow the user to create additional images. These images can be grouped by the user of the computer 84 and then transmitted wirelessly to the mobile phone 80.

In FIG. 14, the computer 84 of FIG. 13 is connected to a local area network server 90, which is in turn connected to two other computers 82, 83. One of the other computers 83 is connected to a scanner 88 and the other 82 is temporarily connected the mobile phone 80 for the transmission of data. A user of any of the computers 82, 83, 84 may create images and store them on the server 90. The user of the computer 82 can then transmit selected images as one or more groups to the phone 80 for display.

The present invention has been described with particular reference to mobile phones, but is also particularly applicable to personal organisers such as PDAs, portable music players, games consoles and other mobile electronic communications devices. Moreover, the present invention also encompasses all mobile electronic communications devices capable of displaying background images as wallpaper, and includes point-of-sale devices.

In the foregoing description, the mobile electronic communications device includes a processor programmed to operate in accordance with the present invention. Preferably, the instruction set (that is, program) controlling the processor to operate in accordance with the present invention is software stored in a memory of the device. However, the instruction set may be hardwired in the device or may be stored remotely from the device and sent only as called upon by the processor. Similarly, the background images need not be stored in the device but can be sent to the device as called upon.

The present invention also includes not only a method of delivering content to mobile electronic communications devices, but also a program for delivering content, a content delivery apparatus, and a mobile electronic communications device programmed to receive content. The method also includes a program for controlling a mobile electronic communications device and a method of sending a program to a mobile electronic communications device.

The foregoing description has been given by way of example only and it will be appreciated by a person skilled in the art that modifications can be made without departing from the spirit and scope of the present invention.

The invention claimed is:

1. A method of delivering content to a mobile electronic communications device, the method comprising: storing in a content delivery apparatus a plurality of images, each image for display by the mobile electronic communications device; transmitting a request for an identification of images stored in the mobile electronic communications device; receiving a response from the mobile electronic communications device; and transmitting together, based upon the response, only the images in a predetermined group of said images that are not stored by the mobile electronic communications device to the mobile electronic communications device, wherein the predetermined group of said images is used as background images for the mobile electronic communications device, a different background image is automatically selected from the predetermined group in response to each time the device deactivates a display light source, and the mobile electronics communications device displays a different background image for each new usage of the phone when the display light source is reactivated.

2. A method according to claim 1, further comprising: receiving a request from a user to transmit the group of images to a said mobile electronic communications device.

3. A method according to claim 1, further comprising: storing a plurality of groups, each of a plurality of images; and transmitting a second group of images to a second mobile electronic communications device.

4. A method according to claim 1, wherein the predetermined group of said images is determined by a request by a user to transmit a selected group of images to a said mobile electronic communications device.

5. A method according to claim 4, further wherein the request is received from the mobile electronic communications device to which the group of images is transmitted.

6. A method according to 4, wherein the request is received from a first electronic device and the group of images is transmitted to a second mobile electronic communications device.

7. A method according to claim 1 or claim 4, wherein the group of images is first transmitted to an intermediate electronic device and then from the intermediate electronic device to a destination mobile electronic communications device, the destination device for displaying each of the images as background images.

8. A method according to claim 1 or claim 4, further comprising:
receiving a group of images from a publishing user; and storing the received group of images in the content delivery apparatus for transmitting to a mobile electronic communications device.

9. A method according to claim 1, further comprising: updating which images of the predetermined group of said images are to be transmitted in a group; and transmitting the updated group of images to the device.

10. A method according to claim 9, further comprising: determining which images in the updated group are stored by the device; and transmitting only the images in the updated group that are not stored by the device.

11. A method according to claim 9, further comprising replacing a group already stored in the device with a corresponding updated group.

12. A method according to claim 9, wherein the device determines which images in an existing group are already stored in the device and adds images from a received corresponding updated group to the existing group.

13. A method according to claim 2 or claim 4, further comprising, before receiving the request from the user to transmit a group of images:
transmitting to the user an identifier of the or each group in the content delivery apparatus, wherein the step of receiving the request comprises receiving a said group identifier.

14. A method according to claim 13, further comprising: transmitting to the user additional information on the or each group of images.

15. A method according to claim 2 or claim 4, comprising transmitting the group of images conditional on receiving a fee.

16. A method according to claim 8, further comprising: receiving the group of images from the publishing user or storing the received group of images conditional on receiving a fee.

17. A method according to claim 1, wherein the group of images is transmitted to the device over the air.

18. A method according to claim 2 or claim 4, wherein the request is received by the content delivery apparatus via the Internet or over the air.

19. A method according to claim 1, further comprising, before transmitting the group of images, transmitting software to the device, the software for controlling the device to store the group of images and to display the group of images.

20. A method according to claim 1, further comprising, before transmitting the group of images, determining an image format by which the device can display images and converting each of the images in the group into the determined format.

21. A method according to claim 1, wherein the content delivery apparatus is a web enabled server.

22. A method according to claim 1, wherein the content delivery apparatus is a server and wherein the server determines which of the predetermined group of said images were added as an update to the predetermined group.

23. A content delivery apparatus for a communications network, the apparatus comprising: a memory having stored therein at least one group of a plurality of images, each image for display by a mobile electronic communications device; a transmission component to transmit a request for an identification of images stored in the mobile electronic communications device; and a receiving component to receive a response from the mobile electronic communications device, wherein the transmission component, based upon the response, further transmits together only the images in the group of images that are not stored by the mobile electronic communications device to the mobile electronic communications device, wherein the group of images is used as background images for the mobile electronic communications device, a different background image is automatically selected from the group of images in response to each time the device deactivates a display light source, and the mobile electronics communications device displays a different background image for each new usage of the phone when the display light source is reactivated.

24. An apparatus according to claim 23, wherein the receiving component is further to receive a request from a user to transmit the group of images to a said device.

25. An apparatus according to claim 24, wherein the the receiving component uses a modem.

26. An apparatus according to claim 24, wherein the apparatus receives an identifier of a mobile electronic communications device with the request and the transmission component transmits the group of images to the identified device.

27. An apparatus according to claim 24, wherein the apparatus receives with the request an identifier of an electronic device other than a mobile electronic communications device and the transmission component transmits the group of images to the identified other device.

28. An apparatus according to claim 24, wherein the receiving component is arranged to receive a group of images from a publisher; and
the apparatus is arranged to store the received group of images in the memory for transmitting to a mobile electronic communications device.

29. An apparatus according to claim 23 or claim 24, further comprising:
an updating component for updating the images in the group.

30. An apparatus according to claim 23, wherein the apparatus is arranged to transmit to a user an identifier of the or each group in the content delivery apparatus, to receive a request including a said group identifier and to transmit to a mobile electronic communications device the group identified by the group identifier included in the request.

31. An apparatus according to claim 23, further comprising a payment module to control any of transmission, reception and storage of a group of images depending on authorization of a payment.

32. An apparatus according to claim 23, wherein the network includes at least one of the Internet, a local area network and a mobile telecommunications network.

33. An apparatus according to claim 23, wherein the apparatus is arranged to transmit software to the device, the software for controlling the device to store the group of images and to display the group of images.

34. An apparatus according to claim 23, wherein the apparatus is arranged to:
transmit a request for an identification of an image format by which the device can display images;
receive a response from the device;
convert the images in the group into the identified format; and
transmit the converted images to the device.

35. An apparatus according to claim 23, wherein the apparatus is a web enabled server.

36. An apparatus according to claim 23, wherein the apparatus is a server and wherein the server determines which of the predetermined group of said images were added as an update to the predetermined group.

37. A non-transitory computer-readable medium having stored thereon a program, which, when executed, causes a mobile electronic communications device to receive a request for an identification of images stored in the mobile electronic communications device; transmit a response identifying the image stored in the mobile electronic communications device; receive together, based upon the response, only the images in a predetermined group of images that are not stored by the mobile electronic communications device; store said received group of images; and display said images as background images for the mobile electronic communications device, wherein a different background image is automatically selected from the predetermined group in response to each time the device deactivates a display light source, and the mobile electronics communications device displays a different background image for each new usage of the phone when the display light source is reactivated.

38. A non-transitory computer-readable medium having stored thereon a program, which, when executed, causes a content delivery apparatus to store a plurality of images, each image for display by a mobile electronic communications device; transmit a request for an identification of images stored in the mobile electronic communications device; receiving a response from the mobile electronic communications device; and transmit together, based upon the response, only the images in a predetermined group of said images that are not stored by the mobile electronic communications device to the mobile electronic communications device, wherein the predetermined group of said images is used as background images for the mobile electronic communications device, a different background image is automatically selected from the predetermined group in response to each time the device deactivates a display light source, and the mobile electronics communications device displays a different background image for each new usage of the phone when the display light source is reactivated.

39. A method of delivering images to a cell phone, the method comprising: storing a plurality of groups of images on a server; receiving at the server a request from a first user to transmit a selected group of images for viewing on a cell phone; transmitting a request for an identification of images stored in the cell phone; receiving a response identifying the images stored in the cell phone; transmitting, based upon the response, only the images in the selected group that are not stored by the cell phone to allow storage of the transmitted images from the selected group in the cell phone, wherein the selected group of images is used as background images for the cell phone, a different background image is automatically selected from the selected group in response to each time the cell phone deactivates a display light source, and the cell phone displays a different background image for each new usage of the phone when the display light source is reactivated.

40. A method according to claim 39, wherein the selected group of images is published on the server by a second user.

41. A method according to claim 40, further comprising:
updating the images in the selected group stored on the server; and
automatically transmitting an update for the group stored on the cell phone.

42. A method according to claim 41, wherein the second user updates the selected group of images.

43. A server for delivering images to a cell phone, the server being arranged to store a plurality of images arranged in groups; receive a request from a first user to transmit a selected group of images in a format suitable for display by the cell phone; transmit a request for an identification of images stored in the cell phone; receiving a response identifying the images stored in the cell phone; and transmit, based upon the response, only the images in the selected group that are not stored by the cell phone for storing on the cell phone, wherein the selected group of images is used as background images for the cell phone, a different background image is automatically selected from the selected group in response to each time the cell phone deactivates a display light source, and the cell phone displays a different background image for each new usage of the phone when the display light source is reactivated.

44. A server according to claim 43, further being arranged to:
update the images in the selected group stored on the server; and automatically transmit an update for the group stored on the cell phone.

* * * * *

UNITED STATES PATENT AND TRADEMARK OFFICE
CERTIFICATE OF CORRECTION

| | |
|---|---|
| PATENT NO. | : 8,041,291 B2 |
| APPLICATION NO. | : 11/592397 |
| DATED | : October 18, 2011 |
| INVENTOR(S) | : Jean Marie Hullot et al. |

It is certified that error appears in the above-identified patent and that said Letters Patent is hereby corrected as shown below:

In claim 1 in column 17, line 22, delete "the phone" and insert --the device--

In claim 23 in column 18, line 61, delete "the phone" and insert --the device--

In claim 37 in column 19, line 66, delete "the phone" and insert --the device--

In claim 38 in column 20, line 17, delete "the phone" and insert --the device--

Signed and Sealed this
Sixth Day of March, 2012

David J. Kappos
*Director of the United States Patent and Trademark Office*